(12) United States Patent
Osawa et al.

(10) Patent No.: US 8,206,171 B2
(45) Date of Patent: Jun. 26, 2012

(54) CHARGING CONNECTOR

(75) Inventors: Kiyoshi Osawa, Yokkaichi (JP);
Toshifumi Ichio, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 13/031,723

(22) Filed: Feb. 22, 2011

(65) Prior Publication Data

US 2011/0212645 A1    Sep. 1, 2011

(30) Foreign Application Priority Data

Mar. 1, 2010   (JP) .................................. 2010-044208

(51) Int. Cl.
*H01R 13/627*   (2006.01)

(52) U.S. Cl. ...................................................... 439/352

(58) Field of Classification Search .................... 439/34, 439/350, 352, 353
See application file for complete search history.

(56) References Cited

U.S. PATENT DOCUMENTS

| | | | | |
|---|---|---|---|---|
| 5,350,312 A | * | 9/1994 | Kuno et al. ................... | 439/310 |
| 5,385,480 A | * | 1/1995 | Hoffman ...................... | 439/310 |
| 5,417,579 A | * | 5/1995 | Yoshioka et al. ............. | 439/310 |
| 5,429,524 A | * | 7/1995 | Wakata et al. ................ | 439/310 |
| 5,433,623 A | * | 7/1995 | Wakata et al. ................ | 439/310 |
| 5,458,496 A | * | 10/1995 | Itou et al. ....................... | 439/34 |
| 5,529,510 A | * | 6/1996 | Wakata et al. ................ | 439/310 |
| 5,536,173 A | * | 7/1996 | Fujitani et al. .................. | 439/34 |
| 5,545,049 A | * | 8/1996 | Hasegawa et al. ............ | 439/310 |
| 5,556,284 A | * | 9/1996 | Itou et al. ....................... | 439/34 |
| 5,558,533 A | * | 9/1996 | Hashizawa et al. ........... | 439/310 |
| 5,573,417 A | * | 11/1996 | Hashizawa et al. ........... | 439/310 |
| 5,575,675 A | * | 11/1996 | Endo et al. ..................... | 439/310 |
| 5,577,920 A | * | 11/1996 | Itou et al. ....................... | 439/34 |
| 5,584,712 A | * | 12/1996 | Fukushima .................... | 439/141 |
| 5,614,808 A | * | 3/1997 | Konoya et al. ................ | 320/109 |
| 5,627,448 A | * | 5/1997 | Okada et al. .................. | 439/133 |
| 5,637,977 A | * | 6/1997 | Saito et al. .................... | 320/109 |
| 5,639,256 A | * | 6/1997 | Endo et al. ..................... | 439/358 |
| 5,674,086 A | * | 10/1997 | Hashizawa et al. ........... | 439/310 |
| 5,676,560 A | * | 10/1997 | Endo et al. ..................... | 439/310 |
| 5,751,135 A | * | 5/1998 | Fukushima et al. .......... | 320/107 |
| 5,803,760 A | * | 9/1998 | Ito et al. ........................ | 439/310 |
| 5,820,395 A | | 10/1998 | Hashizawa | |
| 5,873,737 A | * | 2/1999 | Hashizawa et al. ............. | 439/39 |

(Continued)

FOREIGN PATENT DOCUMENTS

DE    102009044179    12/2010

(Continued)

*Primary Examiner* — Ross Gushi
(74) *Attorney, Agent, or Firm* — Gerald E. Hespos; Michael J. Porco

(57) ABSTRACT

A charging connector (10) has a fitting (13) connectable to a vehicle-side connector (50) and a main body (11) with a forward opening (11A) to accommodate the fitting (13) so that a front end of the fitting (13) projects forward from the opening (11A). A lever (14) including an arm (14C) extends from the interior of the main body (11) to the front end of the fitting (13) to hold the vehicle-side connector (50) and the fitting (13) in a connected state. A protective wall (11B) extends forward from the opening (11A) of the main body (11) and covers the arm (14C) between the fitting (13) and itself. A lock (31) is at a front end of the lever (14) and has a lock projection (14A) that projects toward the fitting (13) and a reinforcement (14B) the projects toward a side opposite to the fitting (13).

11 Claims, 7 Drawing Sheets

U.S. PATENT DOCUMENTS

| | | | | |
|---|---|---|---|---|
| 5,906,500 | A * | 5/1999 | Kakuta et al. | 439/310 |
| 6,123,569 | A * | 9/2000 | Fukushima et al. | 439/456 |
| 6,203,355 | B1 * | 3/2001 | Neblett et al. | 439/372 |
| 6,225,153 | B1 * | 5/2001 | Neblett et al. | 438/188 |
| 6,283,781 | B1 * | 9/2001 | Mori | 439/310 |
| 6,371,768 | B1 * | 4/2002 | Neblett et al. | 439/34 |
| 6,652,306 | B2 * | 11/2003 | Karamatsu et al. | 439/310 |
| 7,404,720 | B1 * | 7/2008 | Frey et al. | 439/133 |
| 7,789,690 | B1 * | 9/2010 | Rhein | 439/310 |
| 7,878,866 | B1 * | 2/2011 | Kwasny et al. | 439/695 |
| 7,963,793 | B2 * | 6/2011 | Poulin et al. | 439/352 |
| 8,016,604 | B2 * | 9/2011 | Matsumoto et al. | 439/304 |
| 8,016,607 | B2 * | 9/2011 | Brown, II | 439/353 |
| 8,075,329 | B1 * | 12/2011 | Janarthanam et al. | 439/304 |
| 2002/0177348 | A1 * | 11/2002 | Karamatsu et al. | 439/352 |
| 2011/0034053 | A1 * | 2/2011 | Matsumoto et al. | 439/304 |
| 2011/0070758 | A1 * | 3/2011 | Poulin et al. | 439/153 |
| 2011/0212645 | A1 * | 9/2011 | Osawa et al. | 439/352 |
| 2011/0223792 | A1 * | 9/2011 | Osawa et al. | 439/345 |
| 2011/0318950 | A1 * | 12/2011 | Ichio | 439/345 |

FOREIGN PATENT DOCUMENTS

JP     2010182461     8/2010

* cited by examiner

CHARGING CONNECTOR

BACKGROUND OF THE INVENTION

1. Field of the Invention

The invention relates to a charging connector connectable to a vehicle-side connector that is connected to a battery in a vehicle when the battery is charged.

2. Description of the Related Art

U.S. Pat. No. 5,820,395 discloses a charging connector that can be connected to a vehicle-side connector to charge a battery in a vehicle. The charging connector has a fitting that is connectable to the vehicle-side connector. The fitting is attached to a case body and the case body has a forward opening. A front end portion of the fitting projects forward from the opening. A lever extends forward from the interior of the case body and a lock at the front end of the lever holds the charging connector and the vehicle-side connector in a connected state. The lock is near a middle position between the opening of the case body and the front end of the fitting. Further, a protective wall extends from the opening of the case body to the lock and covers the lever.

The length of the lever of the above-described charging connector may be increased for design reasons. The lock of this longer lever may be at the front end of the connector fitting and can be covered by the protective wall. However, the lock is more likely to interfere with a front end of the vehicle-side connector at the time of connection and hence is subject to an impact. Further, the lock can collide with a protruding object on the ground if the charging connector is dropped by mistake at the time of separation. Thus, the lock of the above-described charging connector is subject to damage.

The invention was developed in view of the above situation and an object is to improve an impact resistance of a lock.

SUMMARY OF THE INVENTION

The invention relates to a charging connector that is connectable to a vehicle-side connector for charging a battery in a vehicle. The charging connector includes a fitting that is connectable to the vehicle-side connector. The charging connector also includes a case with a forward opening. The fitting is accommodated in the case so that a front end of the fitting projects forward from the opening. The charging connector also has a lever with an arm adapted to hold the vehicle-side connector and the fitting in a connected state. At least one protective wall extends substantially forward from the opening of the case and at least partly covers the arm from outside. A lock is provided near a front end of the lever. The lock has a locking claw the projects toward the fitting and at least one reinforcement projects toward a side substantially opposite to the fitting. The reinforcement increases the strength of the entire lock and improves the impact resistance performance.

The arm may extend from the interior of the case to the front end of the fitting.

A protective wall may extend forward from the opening of the case to cover at least part the arm between the fitting and the protective wall.

The lock may be displaceable between a locking position where the lock and a lockable portion on the vehicle-side connector are in a locked state and an unlocking position where the locked state is canceled.

Outer edges of the reinforcement and the protective wall may be flush with each other at the unlocking position.

There is concern that the reinforcement might interfere with other members. However, the outer edge of the reinforcement does not project out from the outer edge of the protective wall even when the lock is at the unlocking position. Therefore the reinforcement is less likely to interfere with other members. The reinforcement is even less likely to interfere with other members when the lock is at the locking position since the outer edge of the reinforcement is retracted from the outer edge of the protective wall.

The lever at the locking position may be in contact with a shock absorbing member.

The lock portion may be biased toward the locking position by a biasing member. The biasing member swiftly moves the lever from the unlocking position toward the locking position when the unlocking portion is released at the unlocking position.

The protective wall may extend up to the front end of the lever and may cover the reinforcement. Thus, the reinforcement is even less likely to interfere with other members.

A hole or recess may be formed in the protective wall to receive at least part of the reinforcement.

The lever may be displaceable in a seesaw manner with a lever pivot point at an intermediate position of the arm.

These and other objects, features and advantages of invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
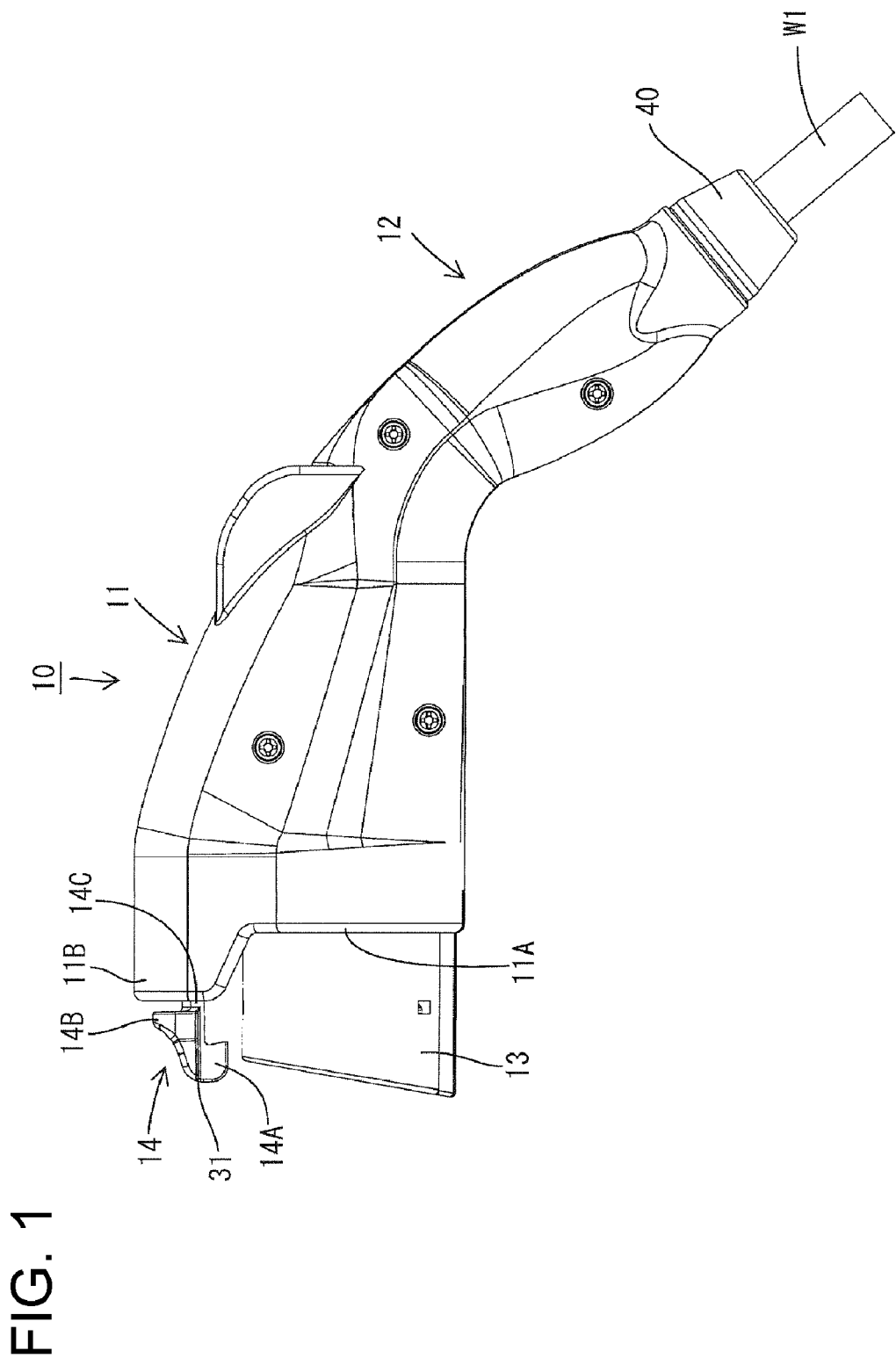
FIG. 1 is a side view showing a charging connector according to a first embodiment.

A charging connector according to a first embodiment of the invention is identified by the numeral 10 in FIGS. 1 to 6. The charging connector 10 is connectable with a vehicle-side connector 50. A connection direction of the charging connector 10 with the vehicle-side connector 50 is referred to herein as the forward direction and hence defines the front end of the charging connector 10. The charging connector 10 is substantially gun-shaped and has a main body 11 at a front part and a grip 12 extending obliquely down from a rear part of the main body 11, as shown in FIG. 1. The main body 11 and the grip 12 are made e.g. of synthetic resin and may be molded unitarily. A tubular fitting 13 projects forward at the front of the main body 11. Further, a lever 14 is accommodated at an upper side of the interior of the main body 11 so that a front end of the lever 14 projects forward from the front edge of the upper surface of the main body 11 to be exposed to the outside. Note that the main body 11 may be considered a case body.

Figure 6:
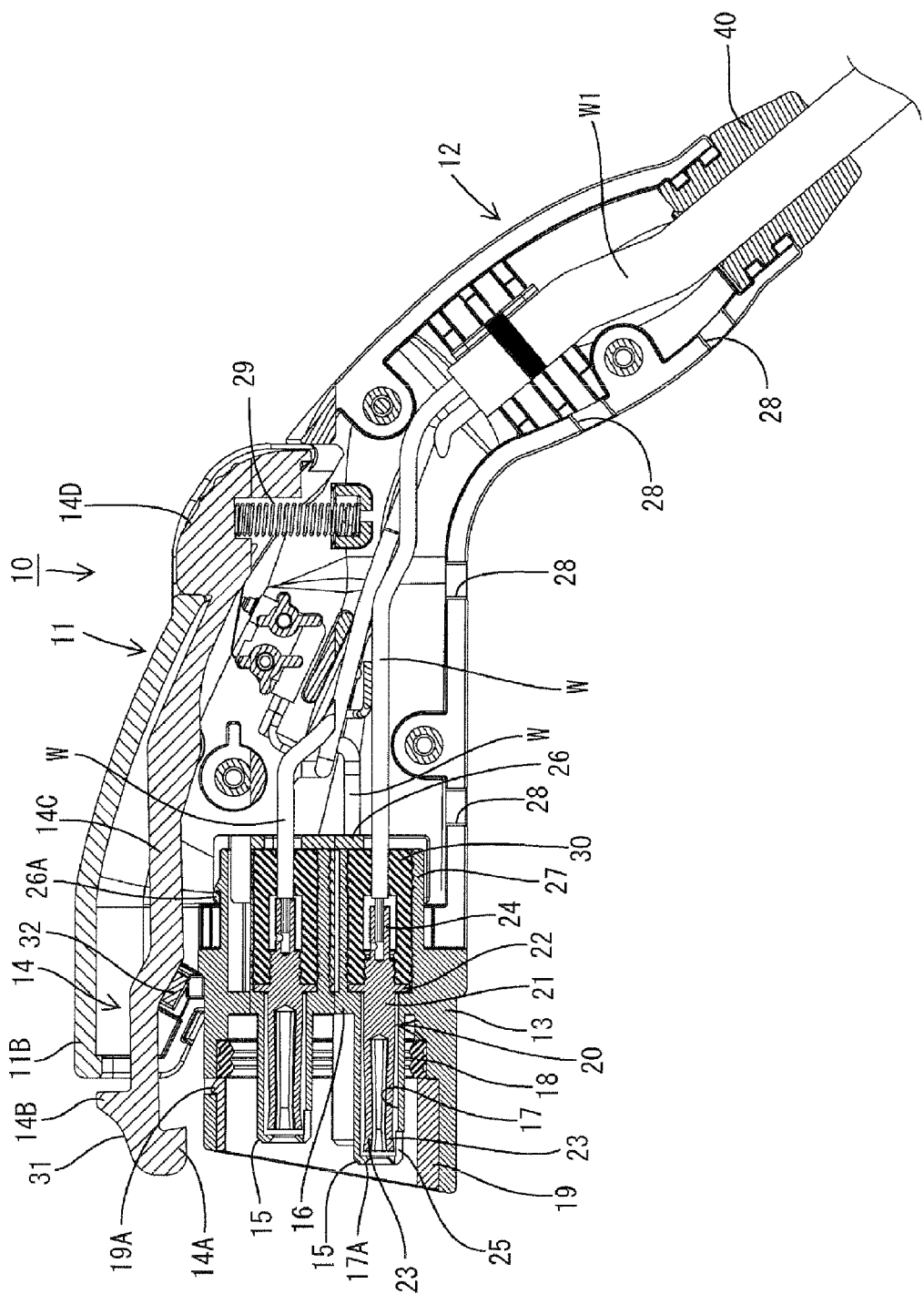
FIG. 6 is a section showing an internal structure of the charging connector when viewed sideways.

As shown in FIG. 6, the fitting 13 is formed separately from the main body 11 and is fixed to the main body 11 by an unillustrated locking means. Substantially cylindrical terminal accommodating portions 15 project forward from a back wall 16 of the fitting 13 and cavities 17 are formed in the terminal accommodating portions 15 for accommodating terminal fittings 20.

Each cavity 17 opens at the rear surface of the back wall 16 of the fitting 13. The terminal fitting 20 is insertable forward into the cavity 17 through a rear end opening and is prevented from moving any further forward by the contact of a flange 22 on the outer circumferential surface of the terminal fitting 20 with the rear end opening edge of the cavity 17. An insertion hole penetrates through a front wall 17A of the cavity 17 and can receive a vehicle-side terminal 60. At least one water drain hole 25 penetrates through a lower side of the front end of the inner wall of the cavity 17. Thus, water that enters the cavity 17 may be drained to the outside through the water drain hole 25.

A cylindrical rubber ring 18 is mounted along the inner circumferential surface of the fitting 13 and a holder 19 for retaining the rubber ring 18 is mounted before the rubber ring 18. The holder 19 has substantially the same cylindrical shape as the rubber ring 18 and includes at lest one lock 19A that is engageable with the inner side of the fitting 13.

Figure 4:
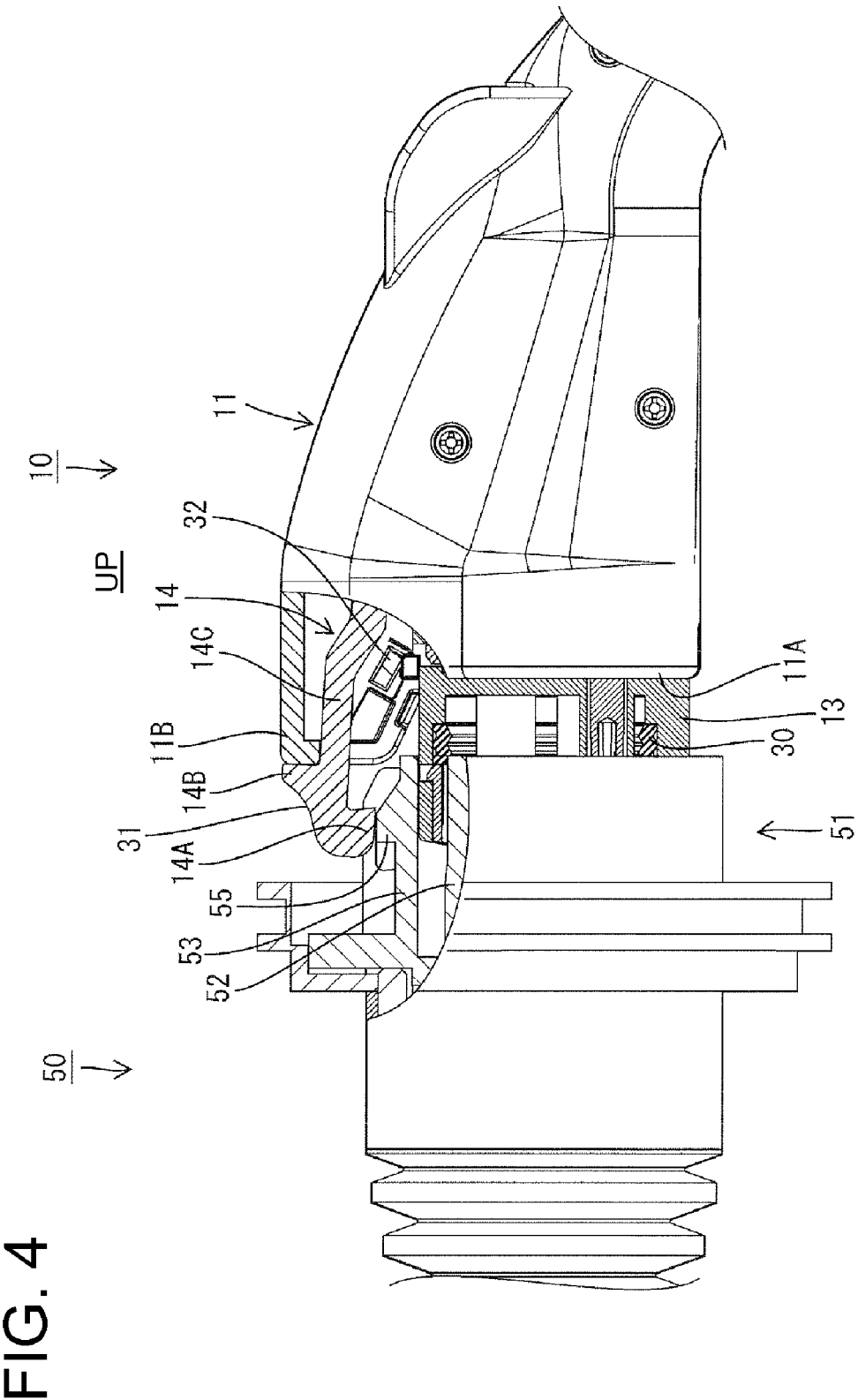
FIG. 4 is a side view partly in section showing an intermediate state of engaging the locking projection and the lock.

A mounting portion for the holder 19 on the inner circumferential surface of the fitting 13 has a larger diameter than the back side of the holder 19. By mounting the holder 19, the inner circumferential surface of the holder 19 and the inner circumferential surface of the fitting 13 behind the rubber ring 18 are aligned and substantially flush. Lips of the rubber ring 18 project radially in on the inner circumferential surface of the holder 19. On the other hand, the vehicle-side connector 50 includes a housing 51 connectable to the charging connector 10, as shown in FIG. 4. The housing 51 is made of synthetic resin and includes a main body 52 can fit into the fitting 13. Thus, the outer circumferential surface of the main body 52 closely contacts the lips of the rubber ring 18 when the main body 52 is fit into the fitting 13, thereby providing waterproofing between the two connectors 10 and 50.

A fitting tube 53 is provided circumferentially on the outer circumferential surface of the housing main body 52. This fitting tube 53 projects forward from a mounting plate 54, so that the fitting 13 can fit between the main body 52 and the fitting tube 53. A lock projection 56 is provided on the upper surface of the fitting tube 53. This lock projection 56 is engageable in a connecting direction with a lock 31 provided near a front end of the lever 14. Accordingly, the lock 31 engages the lock projection 56 when the two connectors 10, 50 are connected to hold the two connectors 10, 50 in a connected state. Note that the mounting plate 54 is to be placed on a mounting opening 56 on a vehicle body and fixed, and a substantially bellows-like grommet 57 is mounted to extend back on a rear part of the mounting opening 56.

Each terminal fitting 20 includes a main body 21 with contact pieces 23. The contact pieces 23 are formed between circumferentially spaced slits that extend back from the front end opening edge of the terminal main body 21. A terminal of this type is called a slotted terminal in some cases.

A wire connection barrel 24 is formed behind the terminal main body 21. An exposed core at an end of a wire W is accommodated in the barrel 21 and is connected electrically conductively to the barrel 24 by crimping, bending or folding the barrel 24. The wire W extends back from the barrel 24 and is drawn out to the outside through the interiors of the main body 11 and the grip 12.

Rubber plugs 30 are accommodated behind the flanges 22, and a back retainer 26 is provided for retaining the rubber plugs 30. Each rubber plug 30 is accommodated in a rubber-plug accommodating portion 27 arranged behind and coaxially with the terminal accommodating portion 15. The back retainer 26 includes locking pieces 26A that engage projections formed on the upper surfaces of the rubber-plug accommodating portions 27. The locking pieces 26A prevent a backward movement of the back retainer 26 and backward movements of the rubber plugs 30 and the flange portions 22.

Wires W extend back in the main body 11 substantially in correspondence with the terminal fittings 20. The wires W are bundled into one cable W1 and covered by an outer sheath in the grip 12. The cable W1 is fixed by a cable grip ring, clip, band or the like in the grip 12 and further fixed by a bush 40 near a rear end portion of the grip 12.

The bush 40 closely contact the inner circumferential surface of the rear end opening of the grip 12 and the outer circumferential surface of the cable W1 to prevent water from entering the interior of the grip 12 through the rear end of the grip 12. Water drain holes 28 are formed in the lower surfaces of the main body 11 and the grip 12 so that any water that may enter the interiors of the main body 11 and the grip 12 can escape to the outside.

The lever 14 includes an arm 14C that extends in forward and backward directions, and an unlocking portion 14D is provided at a rear end of the arm 14C. A lever pivot portion (not shown) is provided substantially in a central part of the arm 14C so that the arm 14C can incline in a seesaw manner with this lever pivot portion as a pivot point to bring both front and rear ends of the arm 14C substantially up and down. A coil spring 29 is mounted in a compressed state below the unlocking portion 14D and biases a rear end portion of the arm 14C up. Thus, the lock 31 constantly biased is toward a locking position LP shown by solid line in FIG. 5. On the other hand, the unlocking portion 14D can be pushed down to displace the lock 31 up to an unlocking position UP shown by chain double-dashed line in FIG. 5.

Figure 5:
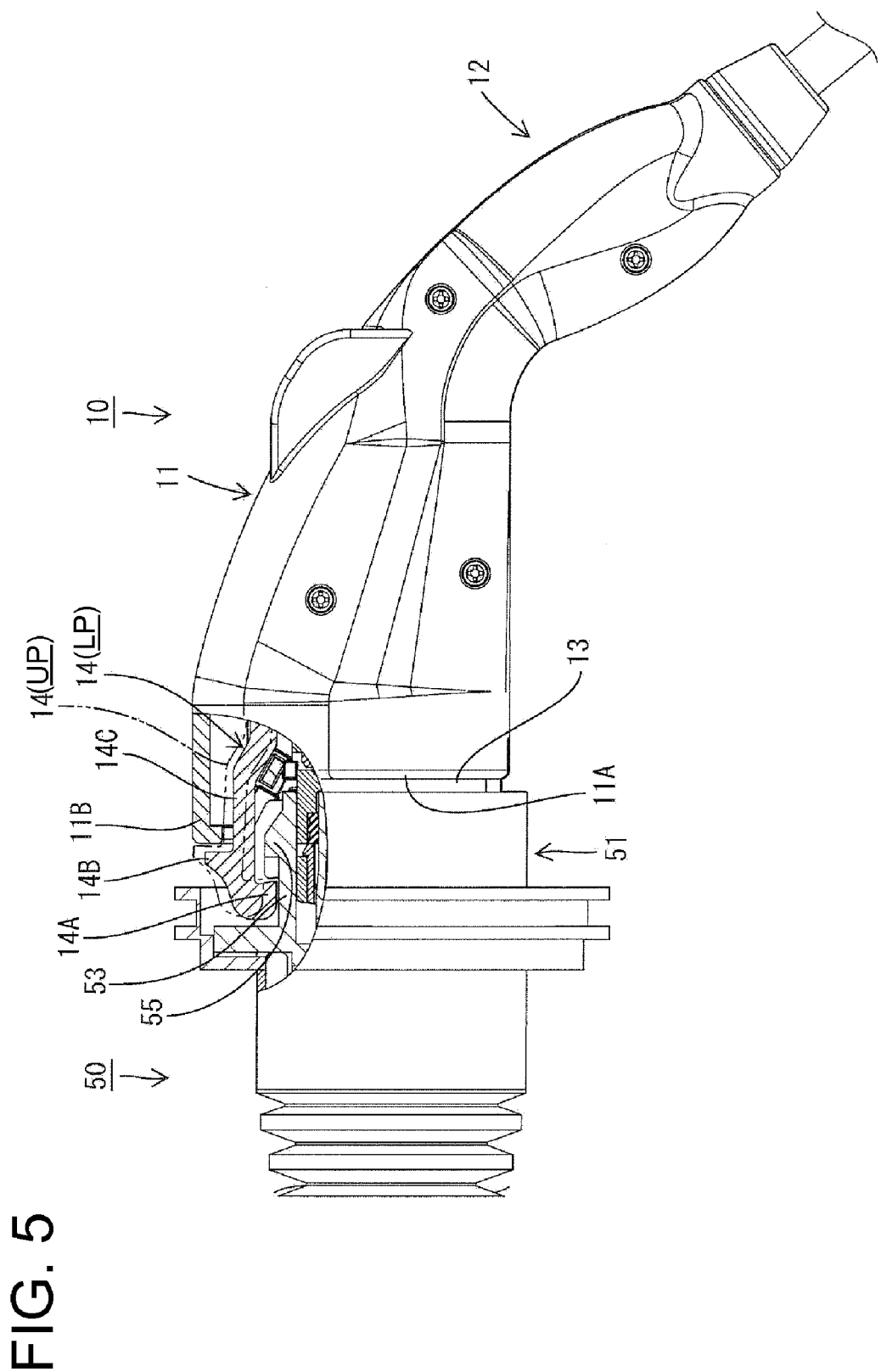
FIG. 5 is a side view partly in section showing a locked state of the locking projection and the lock.

As shown in FIG. 5, the lever 14 at the locking position LP is in contact with a shock absorbing pad 32 provided at a position substantially corresponding to an opening 11A of the connector main body 11 in the connector main body 11. Thus, when the unlocking portion 14D is released at the unlocking position UP, the lever 14 swiftly moves from the unlocking position UP towards or to the locking position LP due to a biasing or spring force of the coil spring 29, but an impact is absorbed when the arm 14C collides with the shock absorbing pad 32 and a movement of the lever 14 substantially is stopped at the locking position LP.

Figure 2:
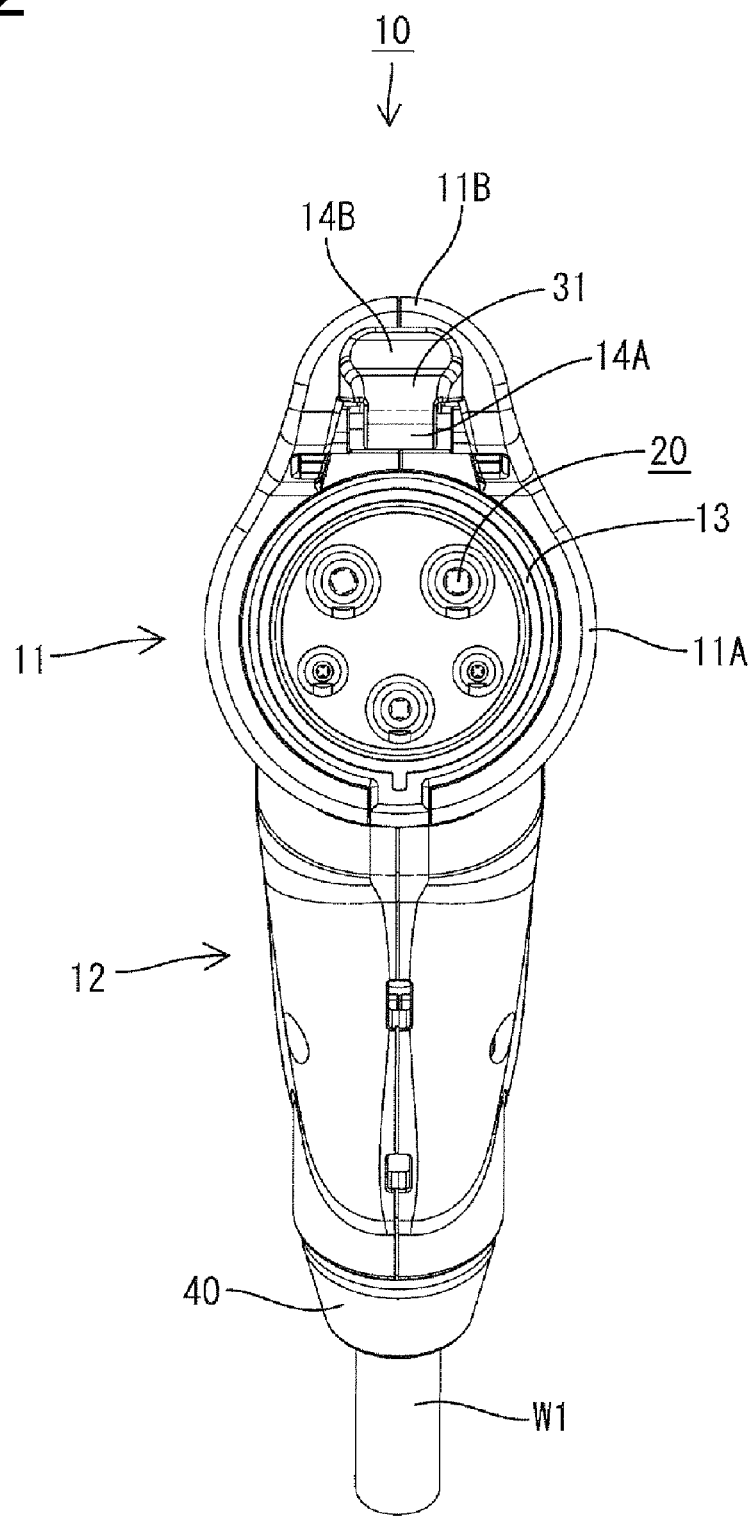
FIG. 2 is a front view showing the charging connector.
Figure 3:
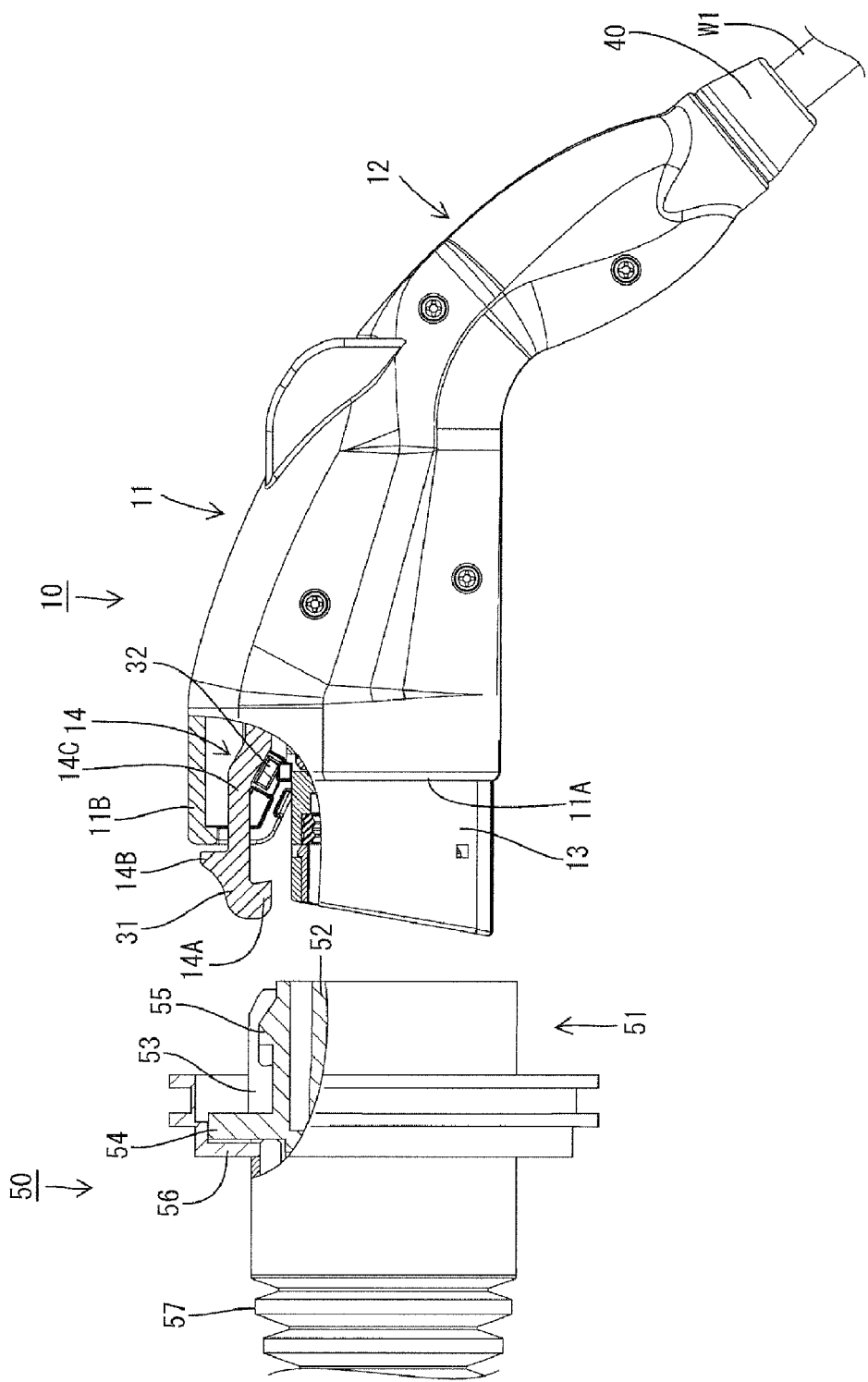
FIG. 3 is a side view partly in section showing a state before a locking projection and a lock are engaged.

As shown in FIG. 5, the opening 11A of the main body 11 is arranged to face the opening edge of the fitting tube 53 with the two connectors 10, 50 connected. The connector main body 11 bulges out and up at a position corresponding to the lever 14, as shown in FIG. 2, and a protective wall 11B is formed at a front end portion of this bulge. As shown in FIG. 1, the protective wall 11B projects forward from the opening 11A. Thus, the arm 14C of the lever 14 is between the upper or outer surface of the fitting 13 and the protective wall 11B and is protected by being covered by the protective wall 11B.

The lock 31 at the front end portion of the lever 14 has a locking projection 14A projecting substantially perpendicularly down and a reinforcing projection 14B projecting substantially upward and outward. Thus, the lock 31 is thicker than the arm 14C and is stronger than a lock that has no reinforcing projection 14B. As shown in FIG. 4, the upper edge of the reinforcing projection 14B is aligned to be substantially flush with the upper edge of the protective wall 11B when the lever 14 is at the unlocking position UP. Thus, the outer edge of the reinforcing projection 14B does not project from the outer edge of the protective wall 11B even when the lock 31 is at a highest or most-outward position, i.e. at the unlocking position UP. In this way, interference of the reinforcing projection 14B with other members can be avoided.

The construction as described above can display the following functions and effects. When the two connectors 10, 50 are connected in a state of FIG. 3, the locking projection 14A of the lock 31 moves onto the lock projection 55 and the lever 14 reaches the unlocking position UP, as shown in FIG. 4. When the two connectors 10, 50 are connected further, they reach a connected state. At this position, the locking projection 14A moves beyond the lock projection 55, the lever 14 resiliently returns to the locking position LP and the locking projection 14A and the lock projection 55 engage in the connecting direction. Thus, the two connectors 10, 50 are locked in the connected state. Further, when the unlocking portion 14D is pushed, the lever 14 is inclined to the unlocking position UP to disengage the locking projection 14A and the lock projection 55, and the two connectors 10, 50 can be separated by being pulled apart from each other.

As described above, the lock 31 may be brought into collision with the opening edge of the fitting tube 53 by mistake, for example, when the charging connector 10 is connected to the vehicle-side connector 50 at the time of charging. However, the reinforcement 14B of this embodiment reinforces the lock 31 to prevent damage to the lock 31. Further, the charging connector 10 may be dropped by mistake when no charging is performed. In this case, the lock 31 collides with the ground and may be subject to an impact. However, the reinforcement 14B reinforces the lock 31 to prevent damage to the lock 31. Therefore, an impact resistance performance of the lock 31 is improved.

A second embodiment of the invention is described with reference to FIG. 7. A charging connector 60 of the second embodiment differs from the first embodiment in the construction of the lock 31 and the protective wall 11B. Other constructions, functions and effects are similar to the first embodiment and not described, but are identified by the same reference numerals.

Figure 7:
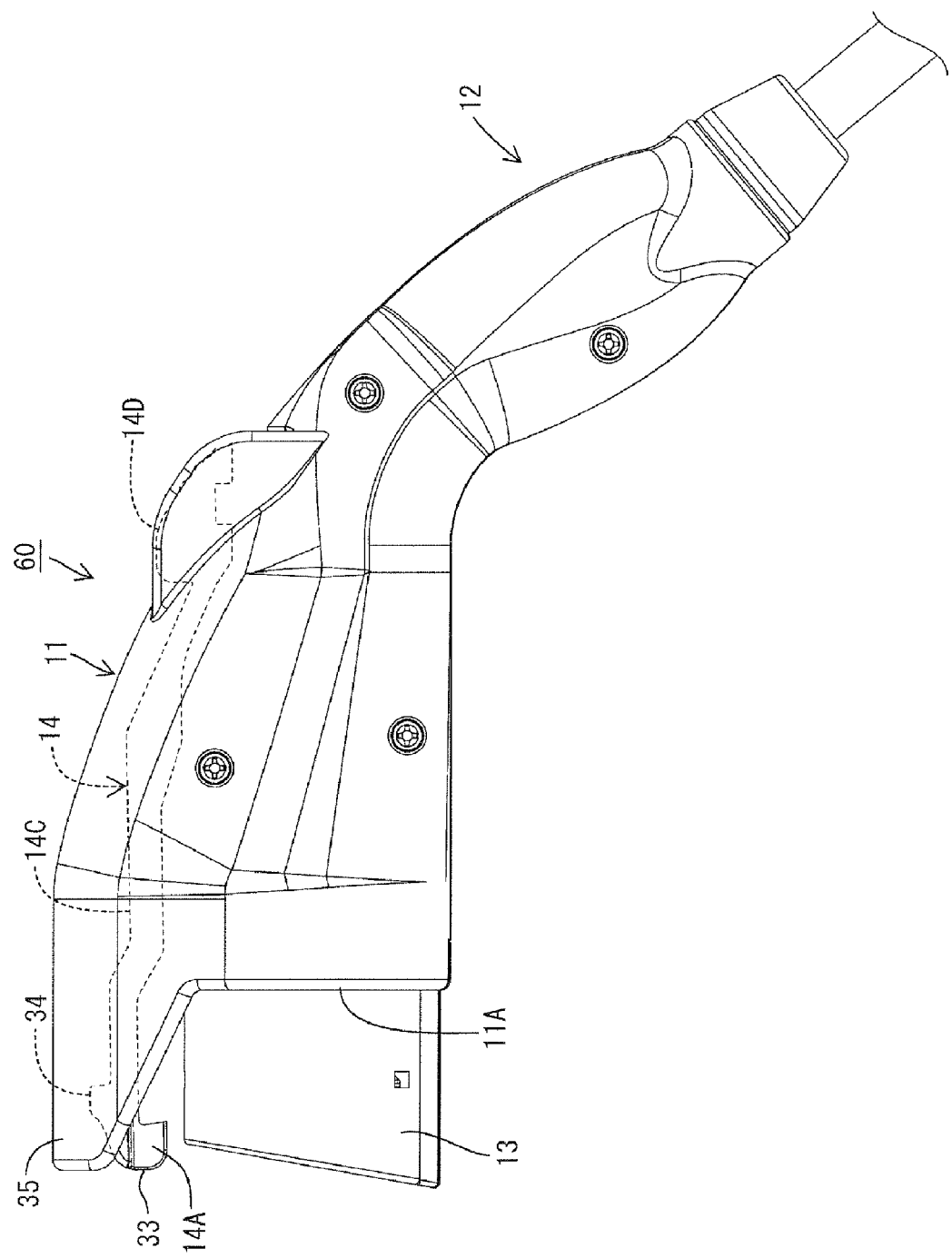
FIG. 7 is a side view showing a charging connector according to a second embodiment.

The charging connector 60 has a lock 33 with a reinforcement 34 with a projecting height that is lower than the reinforcement 14B of the first embodiment, as shown in FIG. 7. However, a protective wall 35 is arranged in a space formed by lowering the reinforcement 34. In other words, the protective wall 35 extends from an opening 11A of a main body 11 substantially to the front end of a lever 14 and covers both an arm 14C and the lock 33. Accordingly, the lock 33 is less likely to collide with other members than in the first embodiment. When a protruding object is present on the ground, even if a charging connector 10 should be dropped by mistake and the lock 33 should collide with the protruding object, damage of the lock 33 can be avoided since the lock 33 is reinforced by the reinforcement 34.

The invention is not limited to the above described and illustrated embodiments. For example, the following embodiments also are included in the technical scope of the invention.

Although the grip 12 is provided in the above embodiments, a charging connector may include no grip according to the present invention.

Although the protective wall 11B covers only the arm 14C in the first embodiment, the protective wall may be formed to substantially extend up to the front end of the lever 14. A hole or recess may be formed in the protective wall for receiving the reinforcement 14B. Alternatively, upper edges of the reinforcement 14B and the protective wall may be aligned and flush with each other by the reinforcing projection 14B being fitted into the hole.

What is claimed is:

1. A charging connector connectable to a vehicle-side connector connected to a battery in a vehicle when the battery is to be charged, comprising:
   a fitting connectable to the vehicle-side connector;
   a case including an opening that is open forward and adapted to accommodate the fitting therein in a state where a front end of the fitting projects forward from the opening;
   a lever including an arm adapted to hold the vehicle-side connector and the fitting in a connected state;
   at least one protective wall extending forward from the opening of the case and at least partly covering the arm from outside; and
   a lock provided at a front end portion of the lever, the lock including a locking claw projecting substantially toward the fitting and at least one reinforcement projecting toward a side substantially opposite to the fitting.

2. The charging connector of claim 1, wherein the arm extends from the interior of the case to the front end of the fitting.

3. The charging connector of claim 1, wherein the protective wall extends substantially forward from the opening of the case to at least partly cover the arm from a side opposite the fitting.

4. The charging connector of claim 1, wherein the lock is displaceable between a locking position where the lock and a lockable portion provided on the vehicle-side connector are in a locked state and an unlocking position where the locked state is canceled.

5. The charging connector of claim 4, wherein outer edges of the reinforcement and the protective wall are aligned and be flush with each other at the unlocking position.

6. The charging connector of claim 5, further comprising a shock absorbing member contacting the lever at the locking position.

7. The charging connector of claim 5, further comprising a biasing member constantly biasing the lock toward the locking position.

8. The charging connector of claim 7, wherein a biasing force of the biasing member swiftly moves the lever from the unlocking position to the locking position when the unlocking portion is released at the unlocking position.

9. The charging connector of claim 1, wherein the protective wall extends to the front end of the lever and covers the reinforcement.

10. The charging connector of claim 9, wherein the protective wall has a hole into for receiving the reinforcement.

11. The charging connector of claim 1, wherein the lever is displaceable in a seesaw manner with a lever pivot portion arranged at an intermediate position of the arm.

* * * * *